July 29, 1958 R. K. LOCKHART 2,845,481

COLOR TELEVISION

Filed July 28, 1954 2 Sheets-Sheet 1

INVENTOR.
ROBERT K. LOCKHART
BY
[signature]
ATTORNEY

July 29, 1958 R. K. LOCKHART 2,845,481

COLOR TELEVISION

Filed July 28, 1954 2 Sheets-Sheet 2

INVENTOR.
ROBERT K. LOCKHART
BY
[signature]
ATTORNEY 2,845,481
Patented July 29, 1958

2,845,481

COLOR TELEVISION

Robert K. Lockhart, Moorestown, N. J., assignor to Radio Corporation of America, a corporation of Delaware Application July 28, 1954, Serial No. 446,232

23 Claims. (Cl. 178—5.4)

The present invention relates to matrix and demodulating circuits, and more particularly to matrix and demodulating circuits of the type employed in color television receivers.

Color images may be transferred electrically by analyzing the light from an object into not only its image elements, as is accomplished by normal scanning procedure, but also by analyzing the light from elemental areas of the image into the selected primary or component colors and thereby deriving therefrom a signal representative of each of the selected color components. A color image may then be reproduced at a remote point by appropriate reconstruction from a component color signal train.

The method proposed for transmitting a color television picture is one based on a set of standards which were authorized by the Federal Communications Commission on December 17, 1953. These standards describe a composite color television signal which contains both the chrominance information and monochrome or luminance information relating to the scene. A color modulated subcarrier which may be demodulated by the processes of synchronous detection is employed to provide color-difference or chrominance signals which describe how each color in the televised scene differs from the monochrome version of the color having the same luminance. It is therefore necessary in a color television receiver to provide means for not only demodulation of the component color-difference or chrominance information, but also to provide matrix circuits which can be utilized to produce suitable combinations of chrominance signals so as to produce a desired set of color-difference signals which, when combined with the monochrome information, yield the recovered component color signals.

The present invention is devoted to a teaching of combined simplified demodulating and matrix means which accomplish this purpose in a novel and direct fashion.

In order to best appreciate the teachings of the present invention, consider in more detail the precise nature of the composite color television signal which conforms to the Federal Communications Commission standards. Three primary colors, red, green and blue are utilized for a description of the color residing in the image to be transmitted. These three primary colors do not appear equally bright because they are located in different parts of the spectrum and hence stimulate the brightness sensation by different amounts. However, if the three primary colors are mixed in the right proportions, it is found that the green primary, which is located at the center of the visible spectrum, accounts for 59% of the brightness sensation while the blue and red primaries account for 11% and 30% respectively. Thus utilizing a color television signal or Y signal according to the equation $$Y=0.30R+0.59G+0.11B. \quad (1)$$

a monochrome signal may be produced; this monochrome signal is generated in accordance with the existing scanning standards; i. e. 525 lines, 60 fields per second and 30 frames per second and is treated exactly like a standard monochrome signal with respect to bandwidth and the addition of synchronizing and blanking pulses.

In order to produce color pictures for the color transmission to a color receiver, it is necessary to produce three color difference signals. These color difference signals are designated as $R-Y$, $G-Y$ and $B-Y$ and indicate, as previously described, how each color in the televised scene differs from the Y signal.

These color-difference signals may be written in the following way to constitute a set of three independent signals:

$$R-Y=0.70R-0.59G-0.11B \quad (2)$$

$$G-Y=-.30R+0.41G-0.11B \quad (3)$$

$$B-Y=-0.30R-0.59G+0.89B \quad (4)$$

where Y is described by Equation 1. These equations cannot be solved for R, G, and B in terms of $R-Y$, $G-Y$, and $B-Y$, but they may be solved to yield any single chrominance signal in terms of the other two; for example $$G-Y=-0.51(R-Y)-0.19(B-Y) \quad (5)$$

The chrominance or color-difference signal information is transmitted on a modulated subcarrier which contains not only the signals described by Equations 2, 3, and 4, but also a continuous change of hue as a function of angle in the modulated color subcarrier. The process of recovering one or more of the color-difference signals is to utilize the principles of synchronous detection wherein a locally generated signal in the receiver having the frequency of the color subcarrier but a particular phase relating to the particular color-difference signal being detected, is heterodyned with the modulated color subcarrier to produce the desired color-difference signal. If a multiplicity of color-difference signals are required, then a series of heterodyning signals must be provided, each accurately phased with respect to the corresponding color-difference signal demodulated.

In order to make the employment of the processes of synchronous detection possible, synchronizing means are provided which utilize a color synchronizing burst which is transmitted on the back porch of the horizontal synchronizing pulse. This color synchronizing burst has the frequency, 3.58 mc., of the color subcarrier, and is phased with respect to the color-difference signals in a manner whereby, for example, the color synchronizing burst leads the $R-Y$ signal by 90°, the $R-Y$ signal leading the $B-Y$ signal by 90° and the $G-Y$ signal by 214.3°.

If a multiplicity of color-difference signals are required, then the processes of synchronous detection may be utilized to provide these signals. However, following from the concepts leading to Equation 5, for example, it is not necessary to demodulate more than two color-difference signals; the third color-difference signal being readily obtainable from suitable combination of the two demodulated color-difference signals. The teachings of the present invention are devoted to the principles and concepts which provide simplified demodulator and matrix means which yield a trio of required color-difference signals from a modulated color subcarrier in a manner involving not only new and novel concepts, but also simplification of circuitry, D.-C. coupling, directness of approach and ease in adjustment.

It is therefore an object of this invention to provide an improved matrixed demodulator circuit for providing color difference signals in a color television receiver.

It is still another object of this invention to provide a combined demodulator and matrixed circuit which demodulates two of three prescribed color-difference signals and, by matrixing, forms a third at an amplitude level commensurate with the amplitude level of the first and second.

It is yet another object of this invention to provide a "boot-strap" type of color-difference-signal adder circuit for use in a matrixed demodulator.

It is still a further object of this invention to provide a one-tube matrix demodulator circuit which accepts a chrominance signal and a synchronous detection signal and yields a trio of color-difference signals at an amplitude level suitable for application directly to a color image reproducer.

According to the invention, a combined demodulator and amplifier is used for both $B-Y$ and $R-Y$ color-difference signal information. The synchronous detection is provided by suitable circuitry which accepts the synchronous demodulating signal in the cathode circuits of each of the combined demodulators and amplifiers. The cathode circuits of the combined demodulators and amplifiers are coupled to a fixed reference potential terminal which is then coupled to ground through a resistor in a manner which yields "boot-strap" type of operation. The chroma is applied between the control grids of each of the combined demodulators and amplifiers and the reference potential terminal with the $G-Y$ signal formed at a commensurate amplitude level by proper design of the "boot-strap" resistor and the loading elements of each of the combined demodulators and amplifiers.

Other and incidental objects of this invention will become apparent upon a reading of the following specification and an inspection of the drawings wherein.

Figures 1, 2:
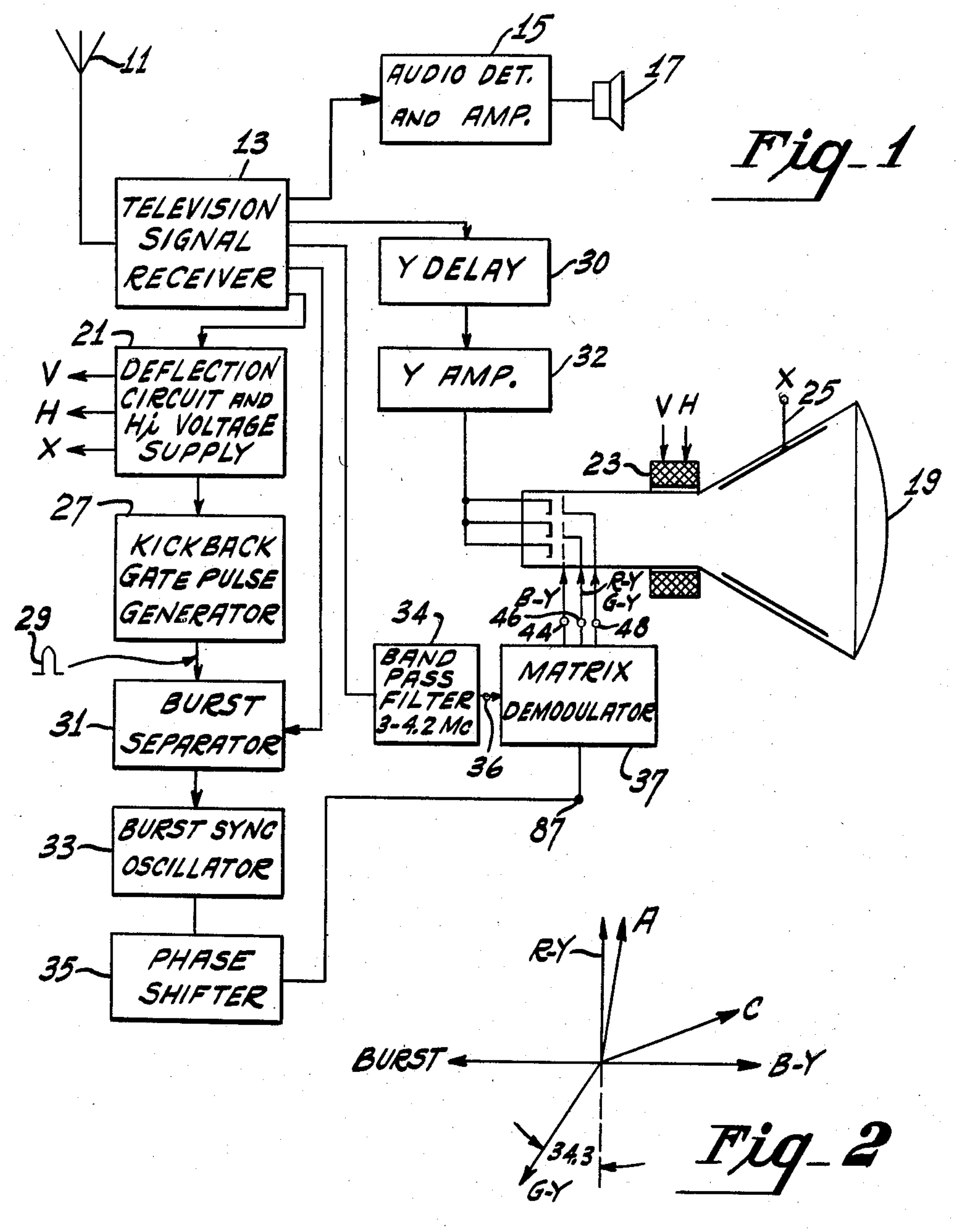
Figure 1 shows a block diagram of a color television signal receiver which employs a matrixed demodulator 37 which utilizes the teachings of the present invention.
Figure 2 shows a vector diagram relating to various color difference signals with respect to phase in the modulated subcarrier.

Consider now the block diagram of the color television receiver shown in Figure 1. Here the incoming signal arrives at the antenna 11 and is applied to the television signal receiver 13. The television signal receiver 13 then delivers a recovered color television signal including the sound information, which is transmitted on a sound carrier 4½ mcs. removed from the picture carrier. The television signal receiver 13 includes the functions of first detection, intermediate frequency amplification, second detection and automatic gain control. Many of these functions are described in Chapter 22 of the book "Harmonics, Sidebands and Transients in Communication Engineering," by C. Louis Cuccia, published by the McGraw-Hill Book Company in 1952.

The sound information is then recovered by using, for example, the well known principles of intercarrier sound in the audio detector and amplifier 15; the recovered information is then applied to the loud speaker 17.

The color television signal information relating to the image is accommodated in at least four channels of the color television receiver, these channels being adapted to produce the recovered color signals which are applied to the color kinescope 19.

One branch emanating from the television signal receiver 13 is concerned with the picture synchronizing signals. This branch is applied to the deflection circuits and high voltage supply 21 which delivers deflection signals to the yokes 23, in addition to a high voltage signal to the ultor 25. Another function of the deflection circuits and high voltage supply 21 is to activate the kickback gate pulse generator 27. The kickback gate pulse generator 27 is usually a winding which is included on the high voltage supply transformer; it has the function of providing a gating pulse 29 during the horizontal blanking period.

Another branch emanating from the television signal receiver 13 is impressed on the burst separator 31 upon which is also impressed the kickback pulse 29. The kickback pulse is timed whereby it opens a burst gate during the duration interval of the color synchronizing burst thereby causing burst separation. The separated burst is then fed by the burst separator 31 to the burst synchronized start-stop oscillator 33 which, utilizing the separated burst and the kickback pulse 29 produces a local oscillator signal which is accurately synchronized with the phase and frequency of the color synchronizing burst.

Another branch emanating from the television signal receiver is applied to the band pass filter 34 which filters out those television picture components outside of the band from approximately 2.75 or less to 4.2 mcs., thereby yielding only the modulated color subcarrier with double side band information relating to modulating signal components up to 0.75 or more megacycles, this modulated color subcarrier information constituting the chroma information. The output of the band pass filter 34 is then passed to the matrixed demodulator 37 which operates according to the teachings of the present invention, utilizing a reference signal of proper phase as provided by the phase shifter 35. The output of the matrixed demodulator 37 then yields $R-Y$, $B-Y$ and $G-Y$ color-difference signals which are applied to appropriate control grids of the color kinescope 19. The luminance or Y information is passed from the television signal receiver 13 through the Y delay line 30 and the Y amplifier 32 to all of the cathodes of the color kinescope 19 so that an additive effect takes place between the Y information as impressed upon each of the cathodes and the $R-Y$, the $B-Y$ and the $G-Y$ information, respectively, on each of the corresponding control grids, thereby yielding red, blue and green color information into the scanning electron beams employed in the color kinescope 19.

Figure 3:
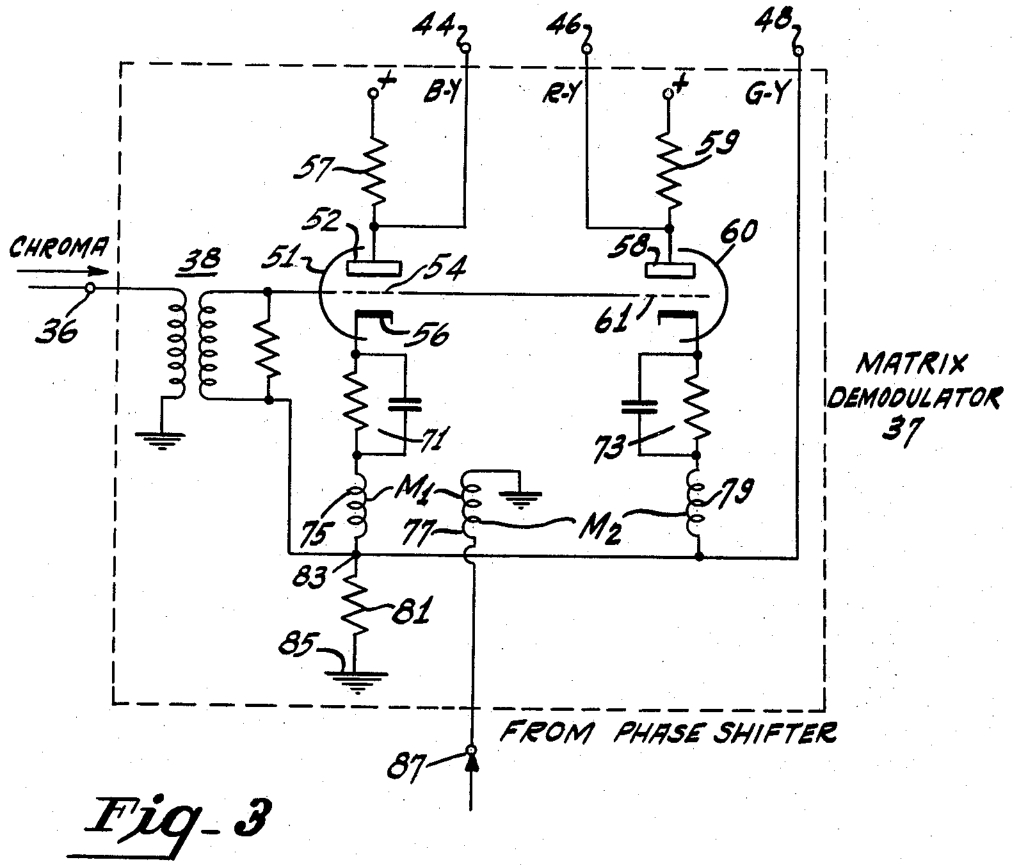
Figure 3 shows one embodiment of the matrixed demodulator 37.

Consider now the operation of the matrixed demodulator 37 which is included in Figure 1, one embodiment of which is shown in schematic form in Figure 3. In this circuit a pair of triodes 51 and 60 are used which can be accommodated within a single envelope, thereby permitting the use of a single electron tube to perform the matrix and demodulation functions. In the circuit of the triode 51, for example, is included the plate resistor 57, the biasing circuit 71, and the winding 75. The winding 75 is then coupled to the terminal 83 which is a reference terminal to which is referred the potentials applied to the control grid 54. The triode 60 is associated with the plate resistor 59, the bias circuit 73 and the winding 79 with the low potential end of the winding 79 also connected to the reference terminal 83. The incoming chroma is applied to the terminal 36, is then developed across the transformer unit 38 and applied to the control grids 54 and 61 of the triodes 51 and 60, respectively.

A signal from the phase shifter 35 is applied to the input terminal 87 which delivers this signal to the winding 77. The winding 77 is inductively coupled to the winding 75 and the winding 79 in a manner which provides 3.58 mc. heterodyning or demodulating signals of different phases between the cathode and grid of each of the triodes 51 and 60. The windings and couplings M1 and M2 may be tuned to provide the phases A and C shown in Figure 2. The chroma information applied to the control grids is synchronously detected to provide demodulated color-difference signals appearing at the plate resistors 57 and 59.

The reference terminal 83 is coupled to ground 85 through the "boot-strap" resistor 81. Note that the "boot-strap" resistor 81 does not yield the functions of degeneration with respect to the circuits associated with the triodes 51 and 60. Rather, it uniquely yields addition of the signals which are produced in the plate resistors 57 and 59, although with inverted polarity. The useage of the "boot-strap" resistor 81 then yields a simple and convenient method whereby signal addition of the type providing, for example, $0.51\times(R-Y)$ and $0.19\times(B-Y)$ to yield, as is shown by Equation 5, the $G-Y$ color-difference signal.

Another feature of using the "boot-strap" resistor 81 in a manner shown in the circuit of Figure 3 is that it is possible to develop the $G-Y$ signal at the terminal 83 at an amplitude level commensurate with that developed for the $B-Y$ signal and the $R-Y$ signal in the plate resistors 57 and 59, respectively, thereby leading to the development of the $B-Y$, the $R-Y$ and the $G-Y$ color-difference signals at the output terminals 44, 46 and 48, respectively, from which they may be applied directly to appropriate control electrodes of the color kinescope 19.

One aspect of the operation of the matrixed demodulator 37 is concerned with the phases of the 3.58 mc. demodulating signal produced in the windings 75 and 79. It is seen from Figure 2 that the $R-Y$ and $B-Y$ signals signals may be developed by synchronous detection phases wherein the $R-Y$ phase lags the burst phase by 90°, with the $B-Y$ phase lagging the burst phase by full 180°. However, because the "boot-strap" resistor 81, across which the $G-Y$ signal is produced, acts as a common adder element having an effect on both of the circuits utilizing the triodes 51 and 60, it follows, for example, that if the exact $R-Y$ phase were developed in the winding 79, a certain amount of $R-Y$ signal would also appear in the plate resistor 57 of the other triode 51.

In like fashion, if a $B-Y$ phase were utilized directly in the winding 75 in the circuit of the triode 51, a certain amount of $B-Y$ signal would be developed at the plate resistor 59 of the triode 60, this circuit being intended for developing the $R-Y$. By proper design of the magnitudes of the plate resistors 57 and 59 and by choice, for example, of demodulation phases "A" and "C" shown in Figure 2, the $R-Y$ information developed at the plate resistor 57 can be cancelled out leaving only the $B-Y$ information, and the $B-Y$ information developed at the plate resistor 59 can be cancelled out leaving only the $R-Y$ information. The phase "A" is the phase of the 3.58 mc. demodulating signal developed at the winding 79 and phase "C" is the phase of the 3.58 mc. demodulating signal developed at the winding 75 and it is seen in Figure 2 that an angle less than 90° is involved between phase "A" and phase "C." The precise values of the phases "A" and "C" and their relationship with respect to the burst will, of course, depend upon the circuit parameters involved and in particular the magnitudes of the plate resistors 57 and 59 and the "boot-strap" resistor 81.

The embodiment of the present invention shown in Figure 3 is seen, therefore, to provide the functions of synchronous detection and demodulation and color-difference-signal matrixing in a unique and simple manner utilizing only a single electron tube which contains the equivalent of two triodes within its envelope. The embodiment shown for the matrix demodulator 37 in Figure 3 has the additional feature in that it provides automatic D.-C. coupling, thereby eliminating the need for D.-C. restorers.

Having described the invention, what is claimed is:

1. A matrix demodulator circuit, said matrix demodulator circuit including a source of a modulated subcarrier wave containing a plurality of modulating signals, each of said plurality of modulating signals susceptible to the processes of synchronous demodulation and identified by a predetermined phase of synchronous demodulation, a third signal of said plurality of modulating signals characterized in that it can be formed by a predetermined combination of at least another first and a second of said plurality of modulating signals, said matrix demodulator circuit comprising in combination, a first demodulator circuit, said first demodulator circuit having an output circuit, an input terminal, a high potential terminal and a low potential terminal, means for developing said modulated subcarrier wave from said source between said input terminal of said first demodulator circuit and said low potential terminal and including means to cause synchronous detection of said subcarrier at a first predetermined phase, a second demodulator circuit, said second demodulator circuit having an output circuit, an input terminal, a high potential terminal and a low potential terminal, means for developing said modulated subcarrier wave from said source between said input terminal of said second demodulator circuit and said low potential terminal and including means to cause synchronous detection of said subcarrier at a second predetermined phase, means for establishing a fixed potential reference terminal, means for coupling said lower potential terminals of said first demodulator circuit and said second demodulator circuit together to form a common lower potential terminal, a "boot-strap" impedance, means for coupling said "boot-strap" impedance between said common lower potential terminal and said fixed potential reference terminal and means for providing suitable potentials between said fixed potential reference terminal and each of said higher potential terminals of said first demodulator circuit and said second demodulator circuit for developing the first of said modulating waves in the output circuit of said first demodulated circuit, said second of said modulating waves in said output circuit of said second demodulator circuit and signal addition of said first modulating signal and said second modulating signal in said "boot-strap" impedance each in prescribed magnitude and polarity to form said third modulating signal across said "boot-strap" impedance.

2. The invention as set forth in claim 1 and wherein said "boot-strap" impedance is a resistor.

3. The invention as set forth in claim 1 and wherein said first prescribed phase utilized for synchronous demodulation in said first demodulated circuit bears a first predetermined relationship to the phase corresponding to said first modulating signal and wherein the synchronous demodulating phase utilized in said second demodulator circuit bears a second predetermined relationship to the phase corresponding to said second modulating signal.

4. In a color television receiver, the combination of, a source of a modulated subcarrier including modulations representative of color difference signals each occurring at a predetermined phase as referred to a reference phase, a first synchronous demodulator for demodulating at a first predetermined phase, a second synchronous demodulator for demodulating at a second predetermined phase, each having an amplifier device provided with an input circuit and an output circuit, means for coupling said source to the input circuits of both said first and second synchronous demodulators, an output current adder circuit coupled to both said first and second synchronous demodulators for adding together demodulated signal currents developed in both said first and second synchronous demodulators without introducing degeneration into the input circuit thereby causing said output current adder circuit to develop a color difference signal consisting of prescribed magnitudes of negative versions of color difference signals corresponding to said first and second predetermined phases and to develop in the output circuit of said first synchronous demodulator a color difference signal corresponding to the sum of a prescribed magnitude of a color difference signal corresponding to said first predetermined phase and a negative polarity version of a color difference signal corresponding to said second predetermined phase and to develop in the output circuit of said second synchronous demodulator a color difference signal made up of prescribed magnitudes of a color difference signal corresponding to a second predetermined phase and a reversed polarity version of a color difference signal corresponding to said first predetermined phase.

5. In a color television receiver, the combination of, a source of a modulated subcarrier including modulations representative of color difference signals each identified by a predetermined phase as referred to a reference phase of said modulated subcarrier, a first synchronous demodulator for demodulating at a first predetermined phase, a second synchronous demodulator for demodulating at a second predetermined phase, each of said synchronous demodulators including an amplifier device having a modulating signal input circuit and an output circuit, means for coupling said source to the modulating signal input circuits of both said first and second synchronous demodulators, an output current adder circuit separate from said output circuits and coupled to both said first and second synchronous demodulators to form a common path to all of the current of both said first and second synchronous demodulators exclusive of currents developed in said modulating signal input circuits thereby adding together demodulated signal currents developed in both said first and second synchronous demodulators without introducing degeneration into the input circuits, whereby said output current adder circuit is caused to develop a color difference signal consisting of the sum of prescribed magnitudes of negative versions of color difference signals corresponding to said first and second predetermined phases.

6. In a color television receiver, said color television receiver adapted to receive a color television signal including a color synchronizing burst and a modulated subcarrier, said modulated subcarrier including a plurality of color difference signals, each of said color difference signals susceptible to demodulation by the processes of synchronous detection and identified by a predetermined phase relative to the phase of said color synchronizing burst, said color television receiver also including a burst synchronized reference signal source including means responsive to said color synchronizing bursts to develop synchronous detection signals at prescribed phases, a matrix demodulator circuit comprising in combination; a first demodulator circuit, a second demodulator circuit, each of said first demodulator circuit and said second demodulator circuit including at least an output circuit, an electron control device having at least an anode, a control electrode, and a cathode, a synchronous voltage network, a high potential terminal and a low potential terminal, means included in each of said first and said second demodulator circuit for coupling each output circuit between said anode and said high potential terminal of its respective demodulator circuit, means for coupling said synchronous voltage network of each demodulator circuit from said cathode to said low potential terminal of that demodulator circuit, means for coupling said burst synchronized reference signal source to the synchronous voltage networks of said first and second demodulator circuits to provide a synchronous detection signal having a first predetermined phase to the synchronous voltage network of said first demodulator circuit and a synchronous detection signal having a second predetermined phase to the synchronous voltage network of said second demodulator circuit, means for coupling said modulated subcarrier to each said control electrode, an impedance device, means for coupling said impedance device to said first and said second demodulators to cause the color difference signal developed in the output circuit of one demodulator to also be developed in prescribed magnitude and polarity in the output circuit of the other demodulator and to develop signal addition of predetermined polarities of the color difference signals developed by both of said demodulators without developing degeneration voltage at said control electrodes.

7. The invention as set forth in claim 6 and wherein said impedance device is a "boot-strap" connected resistor.

8. The invention as set forth in claim 6 and wherein each of said first demodulator circuit and said second demodulator circuit includes a cathode biasing network.

9. In a color television receiver, said color television receiver adapted to receive a color television signal including a color synchronizing burst and a modulated subcarrier, said modulated subcarrier including color difference signals susceptible to demodulation by the processes of synchronous detection and identified by a predetermined phase relative to the phase of said color synchronizing burst, said color television receiver also including a burst synchronized reference signal source, a matrix demodulator circuit, comprising in combination, a first synchronous detector circuit, a second synchronous detector circuit, each of said first synchronous detector circuit and said second synchronous detector circuit having a high potential terminal, a low potential terminal, an input terminal, an output terminal and a synchronous voltage input terminal, an impedance circuit, a potential source, means for coupling said impedance circuit and said potential source serially from both of the low potential terminals of said first and second synchronous detector circuits to said high potential terminal, means for coupling said modulated subcarrier to each of said input terminals, means for coupling said burst synchronized reference signal source to said first and second synchronous detector circuits to provide a first synchronous detection signal lagging the burst phase by approximately 105° to the synchronous voltage input terminal of said first synchronous detector and a second synchronous detection signal lagging the burst phase by approximately 155° to the synchronous voltage input terminal of said second synchronous detector to cause said impedance circuit to develop a $G-Y$ color difference signal formed by prescribed polarities and magnitudes of the color difference signals occurring in said chrominance signal at the phases of said first and second synchronous detection signals and to cause $R-Y$ and $B-Y$ color difference signals respectively to be developed at the output terminal of said first and second synchronous detectors.

10. In a color television receiver, said color television receiver adapted to receive a color television signal including a color synchronizing burst and a modulated subcarrier, said modulated subcarrier including color difference signals susceptible to demodulation by the processes of synchronous detection and identified by a predetermined phase relative to the phase of said color synchronizing burst, said color television receiver also including a burst synchronized reference signal source, a matrix demodulator circuit, comprising in combination, a first demodulator circuit, a second demodulator circuit, each of said first demodulator circuit and said second demodulator circuit including at least an output circuit, an electron control device having at least an anode, an electron flow control electrode, and a cathode, a synchronous voltage network coupled to said burst synchronized reference signal source, means for coupling said output circuit to said anode and means for coupling said synchronous voltage network to said cathode in each of said first and second demodulators, means for utilizing said synchronous voltage networks to develop a first synchronous detection voltage lagging the burst phase by approximately 105° at the cathode of said first demodulator and a second synchronous detection voltage lagging the burst phase by approximately 155° at the cathode of said second demodulator, means for coupling said modulated subcarrier to produce a subcarrier voltage at each of said electron flow control electrodes, an electron flow coupling device coupled to said first and second demodulators for causing modulations in the electron flow in one synchronous demodulator to pass through the other synchronous detector without producing degeneration relative to said electron flow control electrodes and to cause signal addition of prescribed polarities and magnitudes of color difference signals corresponding to the phases of said first and second synchronous detection voltages to develop an $R-Y$ color difference signal in the output circuit of said first demodulator, a $B-Y$ color difference signal in the output circuit of said second demodulator and a $G-Y$ color difference signal across said impedance device.

11. The invention as set forth in claim 10 and wherein said electron flow coupling device is a "boot-strap" connected resistor.

12. The invention as set forth in claim 10 and wherein each said first demodulator circuit and said second demodulator circuit includes a cathode biasing network.

13. In a color television receiver adapted to receive a chrominance signal including modulations representative of different color difference signals which occur at different phases of said chrominance signal, each of said color difference signals capable of being demodulated by a synchronous demodulator operative at the phase at which that color difference signal occurs in said chrominance signal, the combination of: a high potential point, a fixed potential point, a first and second synchronous demodulator connected to said high potential point and including a separate terminal common to both said first and second synchronous demodulators through which all of the current of said first and second synchronous demodulators flow and which functions as a reference terminal to signals applied to either said first or second synchronous demodulators, and impedance means coupled between said common terminal and said fixed potential point, a potential source coupled between said high potential point and said fixed potential point to apply a potential across said first and second synchronous demodulators and said impedance means whereby all the current developed by said first and second synchronous demodulators passes through said impedance means and whereby a demodulated color difference signal developed in one synchronous detector is produced in negative polarity in both the other synchronous detector and across said impedance means, a first circuit to provide said chrominance signal, a second circuit to provide an alternating current wave having a phase related to the phases of said chrominance signal, means coupling said first and second circuits to said common terminal and to said first and second synchronous demodulators to apply said chrominance signal and an alternating current wave having a first phase of said chrominance signal and an alternating current wave having a first phase of said chrominance signal to said first synchronous demodulator and to apply said chrominance signal and an alternating current wave having a second phase of said chrominance signal to said second synchronous demodulator whereby negative polarities of color difference signals corresponding to information occurring at said first and second phases of said chrominance signal are developed across said impedance means and whereby different color information corresponding to combinations of different polarities of color difference signals corresponding to information occurring at said first and second phases of said chrominance signal are produced in said first and second synchronous demodulators.

14. In a color television receiver adapted to receive a chrominance signal including modulations representative of different color information signals which occur at different phases of said chrominance signals, each of said color information signals capable of being demodulated by a synchronous detector operative at the phase at which that color difference signal information occurs in said chrominance signal, the combination of: a high potential point, a fixed potential point, a first and second synchronous demodulator, an impedance, means coupling said first and second synchronous demodulators between said high potential point and said impedance to form a common terminal common to said first and second synchronous demodulators and to said impedance, means coupling a point of said impedance different from said common terminal to said fixed potential terminal whereby demodulated signals produced in one polarity by one synchronous demodulator are produced in a second polarity in said impedance and in the other synchronous demodulator, a first circuit to provide said chrominance signal, a second circuit to provide an alternating current wave having a phase related to the phases of said chrominance signal, means coupling said first and second circuits to said first and second demodulators and said common terminal to cause said first and second demodulators to respectively demodulate said chrominance signal at first and second phases of said chrominance signal, thereby producing across said impedance color information representative of the same polarity of color difference signal information occurring at said first and second phases of said chrominance signal and to develop in said first and second synchronous demodulators different color information representative of opposite polarities of color difference signal corresponding to color information occurring at said first and second phases of said chrominance signal.

15. In a color television receiver adapted to receive a chrominance signal wherein different color-difference signals occur at different phases, each of said color-difference signals capable of being demodulated in an electron tube wherein said chrominance signal is mixed with an alternating current wave having the phase at which that color-difference signal occurs in said chrominance signal, a matrix demodulator circuit comprising in combination: a first circuit to provide said chrominance signal, a first and second electron tube each having a plurality of electrodes, a first output load coupled to a first of said plurality of electrodes of said first electron tube, a second output load coupled to a first of said plurality of electrodes of said second electron tube, means to commonly couple a second of said plurality of electrodes of each of said first and second electron tubes together, said common coupling means including a terminal point through which current of both said first and second electron tube will flow, a fixed potential terminal, an impedance coupling means coupled between said terminal point and said fixed potential terminal, a potential source coupled between said fixed potential terminal and said first and second output loads, a second circuit to provide an alternating current wave of prescribed phase, means coupled to said first and second circuits and to a third of said plurality of electrodes of each of said first and second electron tubes and said common coupling means to cause said chrominance signal to be mixed with a signal having a first phase of a chrominance signal in said first electron tube and to cause said chrominance signal to be mixed with an alternating current wave having a second phase of a chrominance signal in said second electron tube whereby currents from first and second electron tubes pass through said impedance coupling means to produce thereacross a color-difference signal comprising a combination of negative polarities of color-difference signal information occurring at said first and second phases of said chrominance signal and whereby different polarities of color-difference signal information occurring at said first and second phases of said chrominance signal are produced respectively across said first and second output loads.

16. In a color television receiver adapted to receive a chrominance signal wherein occur different color-difference signals at different phases, each of said color-difference signals capable of being demodulated by a synchronous detector adapted to demodulate at the phase at which that color-difference signal occurs in said chrominance signal, a matrix demodulator circuit comprising in combination, a first and second synchronous detector circuit each including a multi-electrode electron tube and having a common terminal at which the current of both the said multi-electrode electron tubes will pass and having a common input circuit coupled between said common terminal and said first and second synchronous detector, a common output circuit coupled between said common terminal and a fixed potential terminal and responsive to current passing through said first and second multi-electrode electron tubes; each of said first and second synchronous detectors also having a second load circuit and capable of demodulating a chrominance signal applied to said common input circuit at a prescribed phase to produce one polarity of a chrominance signal occurring at that phase in the load circuit of that demodulator and a second and different polarity of that color-difference signal in both said common output circuit and in the output load of the other synchronous detector, means to apply said chrominance signal to said common input circuit, and means coupled to said common input circuit to cause said first and second synchronous detectors to demodulate said chrominance signal at first and second phases respectively to thereby provide different combinations of different polarities of color-difference signal information occurring at said first and second phases of said chrominance signal at the output loads of said first and second synchronous detectors and the same polarity of color-difference information occurring at said first and second phases of said chrominance signal across said common output circuit.

17. In a color television receiver, the combination of: a circuit to provide a chrominance signal wherein information relating to different color difference signals occurs at different phases, each of said color difference signals capable of being demodulated in a synchronous demodulator operative at the phase at which that color difference signal occurs in said chrominance signal, a first synchronous demodulator operative to demodulate said chrominance signal at a first phase, a second synchronous demodulator operative to demodulate said chrominance signal at a second phase, said first and second synchronous demodulators each having an output circuit and commonly coupled to a common chrominance signal input circuit, means coupling said chrominance signal from said first circuit to said common input circuit, a voltage developing circuit means operatively coupled to said first and second synchronous demodulator and comprising a circuit different and separate from said input circuit to provide an impedance path through which all currents of said first and second synchronous demodulators flow and responsive to the color difference signals developed by both said first and second synchronous demodulators for developing a first color difference signal which is a sum of negative polarities of color difference signals corresponding to said first and second phases across said voltage developing circuit means and for developing in the output circuit of said first synchronous demodulator a second color difference signal comprising a combination of a positive polarity of a color difference signal corresponding to said first phase and a negative polarity of a color signal corresponding to said second phase, and for developing in the output circuit of said second synchronous demodulator a third color difference signal corresponding to a combination of a positive polarity of the color difference signal corresponding to said second phase and a negative polarity of the color difference signal corresponding to said first phase.

18. In a color television receiver the combination of: a circuit to provide a chrominance signal wherein are included modulations representative of different color difference signals each of which occurs at a different phase, each of said color difference signals capable of being demodulated as a result of interaction of said chrominance signal, and a demodulating signal having the phase at which that color difference signal occurs in the chrominance signal in the electron stream of an electron tube, a second circuit to provide an alternating current wave having a phase related to a reference phase of said chrominance signal, a first and a second amplifying electron tube each having a plurality of electrodes, first means coupled between said first and second circuits and prescribed electrodes of said first and second electron tubes to introduce modulations representative of both a chrominance signal and a demodulating signal having first phase relationship with that chrominance signal in the electron stream of said first electron tube and to introduce modulations representative of a chrominance signal and also a demodulating signal having a second phase relationship with respect to that chrominance signal into the electron stream of said second electron tube, a common current path coupled to said means and thereby to said first and second electron tubes to form a common current path through which all of the current of said first and second electron tubes pass and which comprises a circuit which is undegenerative to the chrominance signal and any demodulating signals introduced as modulations into said first and second electron tubes and operative to cause demodulated signals produced by one electron tube to be developed in opposite polarity in the other electron tube and across said common current path whereby a first polarity of color information occurring at both said first and second phases of said chrominance signal is produced across said common current path and different color difference signals representative of different polarities of color difference signal information occurring at said first and second phases of said chrominance signal are developed respectively at an electrode of each of said first and second electron tubes.

19. In a color television receiver the combination of: a first circuit to provide a chrominance signal wherein are included modulations representative of different color difference signals each of which occurs at a different phase, each of said color difference signals capable of being demodulated as a result of interaction of said chrominance signal with a demodulating signal having the phase at which that color difference signal occurs in the chrominance signal in the electron stream of an electron tube, a second circuit to provide an alternating current wave having a phase related to a reference phase of said chrominance signal, a first and second electron tube each having a plurality of electrodes, first means coupled between said first and second circuits and prescribed electrodes of said first and second electron tubes to introduce modulations representative of both a chrominance signal and a demodulating signal having first phase relationship with said chrominance signal in the electron stream of said first electron tube and to introduce modulations representative of said chrominance signal and also a demodulating signal having a second phase relationship with respect to said chrominance signal into the electron stream of said second electron tube, a common coupling impedance coupled to said first means and to said first and second electron tubes to form a common impedance path through which all of the current of said first and second electron tubes passes and which comprises a bootstrap circuit independent of and decoupled from said first circuit and which is nonresponsive to said chrominance signal and to demodulating signals provided in said first and second circuits other than by way of coupling through the electron current of both said first and second electron tubes whereby color information of a first polarity occurring at both said first and second phases of said chrominance signal is produced across said common coupling impedance.

20. In combination, a first circuit to provide a chrominance signal wherein occur different color difference signals, each of said color difference signals occurring at a different phase of said chrominance signal and capable of being demodulated by mixing said chrominance signal in an electron tube with a demodulating signal having the phase of said chrominance signal at which that color difference signal occurs, a ground terminal, a high potential terminal, a second circuit to provide an alternating current wave having a phase related to the different phases of said chrominance signal, a first electron tube having a plurality of electrodes including a cathode and an anode and a control grid and having a cathode load coupled between said cathode and said ground terminal and an anode coupled between said anode and said high potential terminal, means coupled to said first and second circuits to apply said chrominance signal and a demodulating signal derived from said alternating current wave and having a first phase of said chrominance signal between prescribed electrodes of said first electron tube and an off ground point of said cathode load to mix the applied signals therein to develop a first polarity of a first color difference signal occurring at first phase of said chrominance signal across said anode load and a second and different polarity of said first color difference signal across said cathode load, a synchronous detector coupled to said first and second circuits and operative to demodulate a second color difference occurring at a second phase from said chrominance signal, and means to couple said synchronous detector to said off ground point of said cathode load to develop said second color difference signal in said anode and cathode loads.

21. In a color television receiver, in combination, a first circuit to provide a color information signal, a second circuit to provide an alternating current wave having a phase of said color information signal, a first and second electron tube each having a plurality of electrodes including a cathode and an anode and a control grid, a high potential point, a fixed potential point, a first and second anode load, means coupling said first anode load between the anode of said first electron tube and said high potential point, means coupling said second anode load between the anode of said second electron tube and said high potential point, means to couple the cathode of said first and second electron tubes together to include a common terminal through which the cathode current of both said first and second electron tubes will flow, impedance means coupled between said common terminal and said fixed potential point, and a third circuit coupling said first and second circuit between said cathode coupling means and said first and second electron tubes to apply said color information signal and an alternating current wave having a first phase of said color information signal to prescribed electrodes of said first electron tube and to apply said color information signal and an alternating current wave having a second phase of said color information signal to prescribed electrodes of said second electron tube.

22. A color demodulator circuit comprising in combination: a first and second synchronous demodulator having a common point through which the currents of both said first and second synchronous demodulators flow, means to apply a chrominance signal and a demodulating signal of prescribed phase between said common point and each of said first and second synchronous demodulators, a fixed potential point, a boot strap impedance coupled between said fixed potential point and said common point and comprising a path through which substantially all currents passing through said first and second synchronous demodulators will flow, and potential means coupled between said fixed potential point and said first and second synchronous demolulators.

23. In a color television receiver, the combination of; a first circuit to provide a color information signal capable of being demodulated at each of a plurality of phases by mixing said signal with a demodulating signal having that phase, a second circuit to provide a source of an alternating current waves having a phase related to the phases of said color information signal, a first and second electron tube each having an output electrode and a plurality of electrodes, a fixed potential terminal, a potential means having a low potential terminal coupled to said fixed potential terminal and a high potential terminal, a first load coupled from an electrode of said first electron tube to said high potential terminal, a second load coupled from an electrode of said second electron tube to said high potential terminal, first means to couple said output electrodes of said first and second electron tubes together, said first means including a common terminal at which substantially all current of both said first and second electron tubes will flow, an impedance coupled from said common terminal to said fixed potential point to function as a common path for the current flowing through both said first and second electron tubes, and means coupled from said first and second circuits to said common terminal and to electrodes of said first and second electron tubes to introduce modulations representative of said chrominance signal and a demodulating signal having a first phase of said chrominance signal into the electron stream of said first electron tube and to introduce modulations representative of said chrominance signal and a demodulating signal having a second phase of said chrominance signal into the electron stream of said second electron tube.

References Cited in the file of this patent

UNITED STATES PATENTS

| | | |
|---|---|---|
| 2,680,147 | Rhodes | June 1, 1954 |
| 2,683,770 | Kalfaian | July 13, 1954 |
| 2,743,310 | Schroeder | Apr. 24, 1956 |
| 2,754,356 | Espenlaub | July 10, 1956 |

OTHER REFERENCES

Color TV, Rider Publication, March 1954, pages 141, 142.

Two-Color Receiver, RCA, pages 16, 17, November 1949.